(12) United States Patent
Abraham et al.

(10) Patent No.: US 7,851,556 B2
(45) Date of Patent: Dec. 14, 2010

(54) THERMOPLASTIC VULCANIZATES WITH LOW COMPRESSION SET

(75) Inventors: Tonson Abraham, Strongsville, OH (US); Norman G. Barber, Norwalk, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 454 days.

(21) Appl. No.: 11/653,016

(22) Filed: Jan. 12, 2007

(65) Prior Publication Data

US 2008/0171822 A1 Jul. 17, 2008

(51) Int. Cl.
C08F 8/00 (2006.01)
C08F 290/14 (2006.01)
C08F 36/00 (2006.01)
C08L 25/02 (2006.01)
C08K 5/01 (2006.01)

(52) U.S. Cl. .................. 525/192; 525/50; 525/55; 525/191; 525/241; 525/326.1; 525/331.9; 525/332.5; 524/1; 524/474

(58) Field of Classification Search ............. 525/191, 525/192
See application file for complete search history.

(56) References Cited

U.S. PATENT DOCUMENTS

| | | | |
|---|---|---|---|
| 3,037,954 A | 6/1962 | Gessler et al. | |
| 4,078,020 A | 3/1978 | Rose et al. | |
| 4,113,804 A | 9/1978 | Cotten et al. | |
| 4,202,801 A | 5/1980 | Petersen | |
| 4,311,628 A * | 1/1982 | Abdou-Sabet et al. | 524/447 |
| 4,650,830 A | 3/1987 | Yonekura et al. | |
| 5,051,478 A | 9/1991 | Puydak et al. | |
| 5,143,978 A * | 9/1992 | Berta | 525/240 |
| 5,157,081 A | 10/1992 | Puydak et al. | |
| 5,248,729 A | 9/1993 | Inoue et al. | |
| 5,523,356 A | 6/1996 | Aldrovandi et al. | |
| 5,552,482 A | 9/1996 | Berta | |
| 5,621,045 A * | 4/1997 | Patel et al. | 525/237 |
| 5,952,425 A | 9/1999 | Medsker et al. | |
| 6,180,720 B1 * | 1/2001 | Collina et al. | 525/191 |
| 6,399,710 B1 | 6/2002 | Finerman et al. | |
| 6,667,364 B2 | 12/2003 | Abraham et al. | |
| 6,803,398 B1 * | 10/2004 | Ito et al. | 524/114 |
| 2005/0277735 A1* | 12/2005 | Abraham et al. | 525/88 |
| 2006/0178478 A1* | 8/2006 | Ellul | 525/191 |

FOREIGN PATENT DOCUMENTS

| | | |
|---|---|---|
| EP | 0472956 B1 | 10/1995 |
| JP | 08012719 | 1/1996 |
| JP | 08012719 A * | 1/1996 |
| JP | 08323179 | 12/1996 |
| JP | 2003/113286 | 4/2003 |

OTHER PUBLICATIONS

Translation of JP 08012719 A.*

* cited by examiner

*Primary Examiner*—Mark Eashoo
*Assistant Examiner*—David Karst

(57) ABSTRACT

A thermoplastic vulcanizate comprising a dynamically-cured rubber, where the rubber is selected from the group consisting of ethylene-propylene-non-conjugated diene rubber, propylene-based rubbery copolymers with units derived from non-conjugated diene monomers, and butyl rubber, where dynamic vulcanization is effected with a phenolic resin or a silicon-containing curative, and where the rubber is dynamically cured to an extent where greater than 94% by weight of the rubber is insoluble in cyclohexane at 23° C., and from about 25 to about 250 parts by weight of a thermoplastic polymer phase per 100 parts by weight rubber, where from about 75% to about 100% by weight of said thermoplastic polymer phase includes a butene-1-based polymer.

2 Claims, No Drawings

THERMOPLASTIC VULCANIZATES WITH LOW COMPRESSION SET

CROSS REFERENCE TO RELATED APPLICATIONS

This application claims priority to U.S. application Ser. Nos. 11/402,706 and 11/402,695, filed Apr. 12, 2006, which are incorporated herein by reference.

FIELD OF THE INVENTION

One or more embodiments of the present invention are directed toward thermoplastic vulcanizates that include a butene-1-based polymer in the plastic phase. The thermoplastic vulcanizates of one or more embodiments are characterized by advantageously low compression set.

BACKGROUND OF THE INVENTION

Thermoplastic vulcanizates include blends of dynamically cured rubber and thermoplastic polymers. The rubber may be dispersed within the thermoplastic resin phase as finely-divided rubber particles. These compositions have advantageously demonstrated many of the properties of thermoset elastomers, yet they are processable as thermoplastics.

Isotactic poly(butene-1) and copolymers including butene-1 mer units have been employed within the thermoplastic phase of thermoplastic vulcanizates. In particular, butene-1-based polymers have been employed in partially cured thermoplastic vulcanizates that are dynamically vulcanized with peroxides. For example, U.S. Pat. No. 4,650,830 teaches thermoplastic elastomer compositions that include a partially crosslinked ethylene/alpha-olefin copolymer, a polymer composed mainly of 1-butene, and a crystalline polymer composed mainly of propylene. The composition may include from 10 to about 95% by weight of the ethylene/alpha-olefin copolymer, and the weight ratio of 1-butene polymer to crystalline propylene polymer may be from 20:80 to about 100:0. The partial crosslinking of the ethylene/alpha-olefin copolymer is accomplished with the use of a peroxide using dynamic methods.

U.S. Pat. No. 5,552,482 teaches a blend of a dynamically partially crosslinked thermoplastic elastomer and an uncrosslinked olefin polymer. The thermoplastic elastomer includes a crystalline propylene homopolymer, an amorphous rubber, a semicrystalline ethylene/propylene or ethylene/butylene copolymer, and a crystalline butene-1 homopolymer. The uncrosslinked olefin polymer may include a heterophasic olefin polymer, a crystalline butene-1 homopolymer, or a substantially amorphous ethylene/propylene or ethylene/butylene copolymer. The blend is prepared by first forming the thermoplastic elastomer by dynamically-partially crosslinking, with a peroxide, the ingredients of the thermoplastic elastomer, and then blending the dynamically-cured product with uncrosslinked olefin polymer. Dynamic vulcanization partially cures the thermoplastic elastomer to a gel of no more than 94% in cyclohexane.

U.S. Pat. No. 5,143,978 teaches that thermoplastic elastomers including polybutene-1 have improved tensile strength, elongation, and melt flow properties. The thermoplastic elastomers include a propylene polymer, an amorphous ethylene-propylene copolymer rubber, a semi-crystalline, low density, essentially linear ethylene-propylene copolymer, and a polybutene-1. The polybutene-1 is present in an amount from 2 to 20 parts based upon 100 parts of the other stated constituents, and the ratio of the polybutene-1 to the amorphous ethylene-propylene copolymer is less than 0.5. The thermoplastic elastomer is partially cured, which refers to a gel content of no more than 94% in cyclohexane.

The use of peroxide curatives for the rubber in the manufacture of thermoplastic vulcanizates is known to cause degradation of the plastic phase and thereby deleteriously impacts the mechanical properties of the thermoplastic vulcanizate.

Isotactic poly(butene-1) and copolymers including butene-1 have also been employed in fully-cured thermoplastic vulcanizates that are dynamically vulcanized with peroxide or silane-containing curatives. For example, U.S. Pat. No. 6,667,364 teaches thermoplastic vulcanizates that include at least 25% by weight of polyethylene. Where the thermoplastic vulcanizate also includes polypropylene, the polyethylene is present as a major component by weight relative to the polypropylene. A melt viscosity reducer, which may include isotactic poly(1-butene), is present in an amount from 5 to about 50 parts by weight per 100 parts by weight of rubber.

It is generally accepted that, while maintaining a suitable compression set, the upper service temperature of a TPV will directionally relate to the melting point of the plastic phase; namely that using polyolefins having higher melting points in the plastic phase will afford improved compression set in TPVs at higher temperatures. This result would be expected insofar as it would be expected that a plastic phase having a higher melting point would afford improved high temperature (70° C. and 100° C.) elastic recovery of associated TPVs, by virtue of the plastic phase's increased resistance to thermal deformation at higher temperatures. Isotactic homopolypropylene (Tm~165° C.) has been widely adopted as the polyolefin of choice in high temperature TPV applications, for, among other reasons, its high melting point (T. Abraham and C. McMahan, THERMOPLASTIC ELASTOMERS: FUNDAMENTALS AND APPLICATIONS, in *Rubber Compounding; Chemistry and Applications*, B. Rodgers ed., Marcel Dekken, Inc., New York, N.Y., 2004, Ch. 5, p 212).

While it is known to use a variety of different polyolefins, including those having high and low melting points, in TPVs, it is generally taught that TPV compositions may include any of the variety of suitable polyolefins, polypropylene and polyethylene being exemplary, in combination with a variety of different elastomers, EPDM rubber and styrene-butadiene rubber being exemplary, without regard to the melting point characteristic of the polyolefin and the effect of polyolefin melting point on the compression set of the resulting TPV.

SUMMARY OF THE INVENTION

One or more embodiments of the present invention provide a thermoplastic vulcanizate comprising a dynamically-cured rubber, where the rubber is selected from the group consisting of ethylene-propylene-non-conjugated diene rubber, propylene-based rubbery copolymers with units derived from non-conjugated diene monomers, and butyl rubber, where dynamic vulcanization is effected with a phenolic resin or a silicon-containing curative, and where the rubber is dynamically cured to an extent where greater than 94% by weight of the rubber is insoluble in cyclohexane at 23° C., and from about 25 to about 250 parts by weight of a thermoplastic polymer phase per 100 parts by weight rubber, where from about 75% to about 100% by weight of said thermoplastic polymer phase includes a butene-1-based polymer.

One or more embodiments of the present invention also provides a method for preparing a thermoplastic vulcanizate, the method comprising dynamically curing a rubber in the presence of a thermoplastic polymer phase, where the rubber is selected from the group consisting of ethylene-propylene-non-conjugated diene rubber, propylene-based rubbery copolymers with units derived from non-conjugated diene monomers, and butyl rubber, where said step of dynamically vulcanizing is effected with a phenolic resin or a silicon-containing curative, where the rubber is dynamically cured to an extent where greater than 94% by weight of the rubber is insoluble in cyclohexane at 23° C., and where from about 75% to about 100% by weight of said thermoplastic polymer phase includes a butene-1-based polymer.

One or more embodiments of the present invention further provides thermoplastic vulcanizate comprising a dynamically-cured rubber, where the rubber is selected from the group consisting of ethylene-propylene-non-conjugated diene rubber, propylene-based rubbery copolymers with units derived from non-conjugated diene monomers, and butyl rubber, where dynamic vulcanization is effected with a phenolic resin or a silicon-containing curative, and where the rubber is dynamically cured to an extent where greater than 94% by weight of the rubber is insoluble in cyclohexane at 23° C., and from about 25 to about 250 parts by weight of a thermoplastic polymer phase per 100 parts by weight rubber, where from about 75% to about 100% by weight of said thermoplastic polymer phase includes a butene-1-based polymer.

DETAILED DESCRIPTION OF ILLUSTRATIVE EMBODIMENTS

One or more embodiments of the present invention are directed toward thermoplastic vulcanizates that include a butene-1-based polymer as the major constituent in the thermoplastic phase. The rubber phase of the thermoplastic vulcanizate includes a highly-cured olefinic rubber or a highly-cured butyl rubber. In one or more embodiments, dynamic vulcanization of the rubber is advantageously achieved with a phenolic resin or a silane-based curative. In one or more embodiments, the presence of the butene-1-based polymer as the major component within the thermoplastic phase advantageously provides for thermoplastic vulcanizates with lower compression set at 100° C. than conventional thermoplastic vulcanizates where polypropylene is the major component of the plastic phase.

Accordingly, in one or more embodiments, thermoplastic vulcanizates of the present invention include a rubber phase and a thermoplastic matrix or phase including a butene-1-based thermoplastic polymer. The thermoplastic vulcanizates of one or more embodiments may also include other constituents that may be employed in the art of making thermoplastic vulcanizates. For example, the thermoplastic phase may include ethylene-based polymers such as polyethylene or a propylene-based polymer such as polypropylene.

Rubber Phase

The rubbers that may be employed to form the rubber phase include those polymers that are capable of being cured or crosslinked by a phenolic resin or a hydrosilylation curative (i.e., silane-containing curative). Reference to a rubber may include mixtures of more than one rubber. Non-limiting examples of rubbers include olefinic elastomeric copolymers, and mixtures thereof. In one or more embodiments, olefinic elastomeric copolymers include ethylene-propylene-non-conjugated diene rubbers or propylene-based rubbery copolymers containing units derived from non-conjugated diene monomers.

Ethylene-Propylene Rubber

The term ethylene-propylene rubber refers to rubbery copolymers polymerized from ethylene, at least one α-olefin monomer, and at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Copolymers prepared from ethylene, α-olefin, and diene monomers may be referred to as a terpolymer or even a tetrapolymer in the event that multiple α-olefins or dienes are used.

In one or more embodiments, the ethylene-propylene rubber includes from about 12 to about 85% by weight, or from about 20 to about 80% by weight, or from about 40 to about 70% by weight, or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units deriving from α-olefin monomer (e.g., $C_3$-$C_{10}$ olefins such as propylene). Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene.

In one or more embodiments, ethylene-propylene rubber may have a weight average molecular weight ($M_w$) that is greater than 100,000 g/mole, in other embodiments greater than 200,000 g/mole, in other embodiments greater than 400,000 g/mole, and in other embodiments greater than 600,000 g/mole; in these or other embodiments, the Mw of the preferred ethylene-propylene rubber is less than 1,200,000 g/mole, in other embodiments less than 1,000,000 g/mole, in other embodiments less than 900,000 g/mole, and in other embodiments less than 800,000 g/mole. In one or more embodiments, useful ethylene-propylene rubbers have a number average molecular weight ($M_n$) that is greater than 20,000 g/mole, in other embodiments greater than 60,000 g/mole, in other embodiments greater than 100,000 g/mole, and in other embodiments greater than 150,000 g/mole; in these or other embodiments, the $M_n$ of the ethylene-propylene rubbers of one or more embodiments is less than 500,000 g/mole, in other embodiments less than 400,000 g/mole, in other embodiments less than 300,000 g/mole, and in other embodiments less than 250,000 g/mole. Techniques for determining the molecular weight ($M_n$, $M_w$ and $M_z$) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein.

In one or more embodiments, ethylene-propylene rubber may also be characterized by having a Mooney viscosity ($ML_{(1+4)}$ at 125° C.) per ASTM D-1646, of from about 10 to about 500 or from about 50 to about 450.

In one or more embodiments, ethylene-propylene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

In one or more embodiments, the ethylene-propylene rubber may be characterized by a glass transition temperature ($T_g$), as determined by Differential Scanning Calorimetry (DSC) according to ASTM E 1356, that is less than −20° C., in other embodiments less than −30° C., in other embodiments less than −50° C., and in other embodiments from about −20 to about −60° C.

Ethylene-propylene rubber may be manufactured or synthesized by using a variety of techniques. For example, these copolymers can be synthesized by employing solution, slurry, or gas phase polymerization techniques that employ various catalyst systems including Ziegler-Natta systems including vanadium catalysts and take place in various phases such as solution, slurry, or gas phase. Exemplary catalysts include single-site catalysts including constrained geometry catalysts involving Group IV-VI metallocenes. Elastomeric copolymers are commercially available under the tradenames Vistalon™ (ExxonMobil Chemical Co.; Houston, Tex.), Keltan™ (DSM Copolymers; Baton Rouge, La.), Nordel™ IP (Dow), NORDEL MG™ (Dow), Royalene™ (Chemtura) and Buna™ (Lanxess).

Propylene-Based Rubbery Copolymer

In one or more embodiments, the propylene-based rubbery copolymer, which may also be referred to as propylene-α-olefin copolymers, include units (i.e., mer units) derived from propylene, one or more comonomer units derived from ethylene or α-olefins including from 4 to about 20 carbon atoms, and one or more comonomer units derived from dienes. In one or more embodiments, the α-olefin comonomer units may derive from ethylene, 1-butene, 1-hexene, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, α-olefin derived units, and diene-derived units. Stated another way, the propylene-based rubbery copolymers may include at least 60% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived and ethylene-derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the $T_m$ of the propylene-based rubbery copolymer is less than 110° C., in other embodiments less than 90° C., in other embodiments less than 80° C., and in other embodiments less than 70° C.; in these or other embodiments, the propylene-based rubbery copolymer has a Tm of at least 25° C., in other embodiments at least of 35° C., in other embodiments at least of 40° C., and in other embodiments at least of 45° C. In particular embodiments, the propylene-based rubbery copolymer exhibits no melting point.

In one or more embodiments, the propylene-based rubbery copolymer may be characterized by a heat of fusion (Hf), as determined according to DSC procedures according to ASTM E 793. This may be determined by placing 6 to 10 mg of sample into DSC equipment and heating the sample at about 10 ° C./min. In one or more embodiments, the propylene-based rubbery copolymer may be characterized by a heat of fusion of about 0 J/g, in other embodiments at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a heat of fusion that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of propylene units, as measured by $^{13}C$ NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-based rubbery copolymer may have a % crystallinity of from 0.5% to 40%, in other embodiments 1% to 30%, and in other embodiments 5% to 25%. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-ethylene polymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%. In particular embodiments, the propylene-based rubbery copolymer has a crystallinity of 0%.

In one or more embodiments, the propylene-based rubbery copolymer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-792 test method.

In one or more embodiments, the propylene-based rubbery copolymer can have an melt index (MI) (ASTM D-1238, 2.16 kg@190° C.), of less than 10 dg/min, in other embodiments ≦6.5 dg/min, in other embodiments ≦6 dg/min, in other embodiments ≦5.5 dg/min, and in other embodiments ≦5 dg/min.

In one or more embodiments, the propylene-based rubbery copolymer can have a melt flow rate (MFR), as measured according to the ASTM D-1238, 2.16 kg weight@230° C., equal to or greater than 0.2 dg/min, in other embodiments at least 0.2 dg/min, in other embodiments at least 0.5 dg/min, and in other embodiments at least 1.0 dg/min. In these or other embodiments, the melt flow rate may be equal to or less than 350 dg/min, and in other embodiments less than 100 dg/min. In an embodiment, the propylene-based polymer has MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based rubbery copolymers may have a Mooney viscosity [ML(1+4)@125° C.], as determined according to ASTM D-1646, of less than 100, in other embodiments less than 75, in other embodiments less than 60, and in other embodiments less than 30.

In one or more embodiments, the propylene-based rubbery copolymer can have a $M_w$ of about 5,000 to about 5,000,000 g/mole, in other embodiments a $M_w$ of about 10,000 to about 1,000,000 g/mole, in other embodiments a $M_w$ of about 20,000 to about 500,000, g/mole and in other embodiments a $M_w$ of about 50,000 to about 400,000 g/mole.

In one or more embodiments, the propylene-based rubbery copolymer can have a $M_n$ of about 2,500 to about 2,500,000 g/mole, in other embodiments a $M_n$ of about 5,000 to about 500,000 g/mole, in other embodiments a $M_n$ of about 10,000 to about 250,000 g/mole, and in other embodiments a $M_n$ of about 25,000 to about 200,000 g/mole.

In one or more embodiments, the propylene-based rubbery copolymer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution (MWD=($M_w/M_n$)) of the propylene-based rubbery copolymer may be about 1 to about 40, in other embodiments about 1 to about 5, in other embodiments about 1.8 to about 5, and in other embodiments about 1.8 to about 3.

Butyl Rubber

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinylstyrene. Exemplary alkyl substituted vinyl aromatic monomers include α-methylstyrene and paramethylstyrene. These copolymers and terpolymers may also be halogenated such as in the case of chlorinated and brominated butyl rubber. In one or more embodiments, these halogenated polymers may derive from monomer such as parabromomethylstyrene.

In one or more embodiments, butyl rubber includes copolymers of isobutylene and isoprene, and copolymers of isobutylene and paramethyl styrene, terpolymers of isobutylene, isoprene, and vinylstyrene, branched butyl rubber, and brominated copolymers of isobutene and paramethylstyrene (yielding copolymers with parabromomethylstyrenyl mer units). These copolymers and terpolymers may be halogenated.

In one embodiment, where butyl rubber includes the isobutylene-isoprene copolymer, the copolymer may include from about 0.5 to about 30, or from about 0.8 to about 5, percent by weight isoprene based on the entire weight of the copolymer with the remainder being isobutylene.

In another embodiment, where butyl rubber includes isobutylene-paramethylstyrene copolymer, the copolymer may include from about 0.5 to about 25, and from about 2 to about 20, percent by weight paramethylstyrene based on the entire weight of the copolymer with the remainder being isobutylene. In one embodiment, isobutylene-paramethyl styrene copolymers can be halogenated, such as with bromine, and these halogenated copolymers can contain from about 0 to about 10 percent by weight, or from about 0.3 to about 7 percent by weight halogenation.

In other embodiments, where butyl rubber includes isobutylene-isoprene-divinylbenzene, the terpolymer may include from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinylbenzene.

In the case of halogenated butyl rubbers, the butyl rubber may include from about 0.1 to about 10, or from about 0.3 to about 7, or from about 0.5 to about 3 percent by weight halogen based upon the entire weight of the copolymer or terpolymer.

In one or more embodiments, the $T_g$ of useful butyl rubber can be less than about −55° C., or less than about −58° C., or less than about −60° C., or less than about −63° C.

In one or more embodiments, the Mooney viscosity (ML$_{1+8}$@125° C.) of useful butyl rubber can be from about 25 to about 75, or from about 30 to about 60, or from about 40 to about 55.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethylstyrene are available under the tradename EXXPRO™ (ExxonMobil Chemical Co.), star branched butyl rubbers are available under the tradename STAR BRANCHED BUTYL™ (ExxonMobil Chemical Co.), and copolymers containing parabromomethylstyrenyl mer units are available under the tradename EXXPRO 3745 (ExxonMobil Chemical Co.). Halogenated and non-halogenated terpolymers of isobutylene, isoprene, and divinylstyrene are available under the tradename Polysar Buty™ (Lanxess; Germany).

Thermoplastic Phase

As described above, the thermoplastic phase includes a butene-1-based polymer. In one or more embodiments, the thermoplastic phase includes polymer that is not set and can therefore flow where threshold temperatures are met. In one or more embodiments, the butene-1-based polymer is a major constituent of the thermoplastic phase. In certain embodiments, the thermoplastic phase may also include, as a minor constituent, an ethylene-based polymer (e.g., polyethylene) or a propylene-based polymer (e.g. polypropylene).

Butene-1-Based Polymers

Butene-1-based polymers include those solid, generally high-molecular weight isotactic butene-1 resins that primarily comprise units deriving from the polymerization of butene-1. In certain embodiments, at least 90%, in other embodiments at least 95%, in other embodiments at least 98%, and in other embodiments at least 99% of the units of the butene-1-based polymer derive from the polymerization of butene-1. In particular embodiments, these polymers include homopolymers of butene-1.

In one or more embodiments, the butene-1-based polymers include isotactic poly(butene-1) homopolymers. In other embodiments, they include copolymers copolymerized with comonomer such as, but not limited to, ethylene, propylene, 1-butene, 1-hexane, 1-octene, 4-methyl-1-pentene, 2-methyl-1-propene, 3-methyl-1-pentene, 4-methyl-1-pentene, 5-methyl-hexene, and mixtures of two or more thereof.

In one or more embodiments, useful butene-1-based polymers can have a MI (ASTM D-1238, 2.16 kg@190° C.) of about 0.1 to 800 dg/min, in other embodiments from about 0.3 to about 200 dg/min, and in other embodiments from about 0.3 to about 4.0 dg/min. In these or other embodiments, the butene-1-based polymers can have a MI of less than 500 dg/min, in other embodiments less than 100 dg/min, in other embodiments less than 10 dg/min, and in other embodiments less than 5 dg/min.

In one ore more embodiments, useful butene-1-based polymers can have a $T_m$ that is from about 130° C. to about 110° C., in other embodiments from about 125° C. to about 115° C., and in other embodiments from about 125° C. to about 120° C.

The butene-1-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts. Butene-1-based polymers are commercially available. For example, isotactic poly(1-butene) is commercially available under the tradename Polybutene Resins or PB (Basell).

The butene-1-based polymers can have a density, as determined according to ASTM D 792, of from about 0.920 g/cc to about 0.897 g/cc or in other embodiments from about 0.920 g/cc to about 0.910 g/cc. In these or other embodiments, the butene-1-based polymers may have a density greater than 0.910 g/cc, in other embodiments greater than 0.915 g/cc, and in other embodiments greater than 0.917 g/cc.

Ethylene-Based Polymer

Ethylene-based polymers include those solid, generally high-molecular weight plastic resins that primarily comprise units deriving from the polymerization of ethylene. In certain embodiments, at least 90%, in other embodiments at least 95%, and in other embodiments at least 99% of the units of the ethylene-based polymer derive from the polymerization of ethylene. In particular embodiments, these polymers include homopolymers of ethylene.

In certain embodiments, the ethylene-based polymers may also include units deriving from the polymerization of α-olefins such as propylene, 1-butene, 1-hexene, 1-octene, 2-methyl-1-propene, 3-methyl-1-pentene, 4-methyl-1-pentene, 5-methyl-1-hexene, and mixtures thereof.

In one or more embodiments, useful ethylene-based polymers can have a melt index (MI) (ASTM D-1238, 2.16 kg@190° C.) of about 0.1 to 1,000 dg/min, in other embodiments from about 1.0 to about 200 dg/min, and in other embodiments from about 7.0 to about 20.0 dg/min.

In one ore more embodiments, useful ethylene-based polymers can have a $T_m$ that is from about 140° C. to about 110° C., in other embodiments from about 135° C. to about 125° C., and in other embodiments from about 130° C. to about 120° C.

The ethylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts. Ethylene-based polymers are commercially available. For example, polyethylene is commercially available under the tradename ExxonMobil™ Polyethylene (ExxonMobil). Ethylene-based copolymers are commercially available under the tradename ExxonMobil™ Polyethylene (ExxonMobil), which include metallocene produced linear low density polyethylene.

Propylene-Based Polymer

Propylene-based polymers include those solid, generally high-molecular weight plastic resins that primarily comprise units deriving from the polymerization of propylene. In certain embodiments, at least 75%, in other embodiments at lease 90%, in other embodiments at least 95%, and in other embodiments at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$-$C_{20}$ olefins.

In one or more embodiments, propylene-based polymers may include semi-crystalline polymers. In one or more embodiments, these polymers may be characterized by a crystallinity of at least 25% by weight, in other embodiments at least 55% by weight, in other embodiments at least 65%, and in other embodiments at least 70% by weight. Crystallinity may be determined by dividing the heat of fusion of a sample by the heat of fusion of a 100% crystalline polymer, which is assumed to be 209 joules/gram for polypropylene. In one or more embodiments, these polymers may be characterized by a Hf of at least 52.3 J/g, in other embodiments in excess of 100 J/g, in other embodiments in excess of 125 J/g, and in other embodiments in excess of 140 J/g.

In one or more embodiments, useful propylene-based polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, useful propylene-based polymers can have a MFR (ASTM D-1238, 2.16 kg@230° C.) of about 0.2 to 5,000 dg/min, in other embodiments from about 5 to about 500 dg/min, and in other embodiments from about 10 to about 100 dg/min.

In one ore more embodiments, useful propylene-based polymers can have a $T_m$ that is from about 110° C. to about 170° C., in other embodiments from about 140° C. to about 168° C., and in other embodiments from about 160° C. to about 165° C. They may have a $T_g$ of from about −10 to about 10° C., in other embodiments from about −3 to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultra-high molecular weight polypropylene that has a fractional melt flow rate can be employed. In one or more embodiments, polypropylene resins may be characterized by a MFR (ASTM D-1238; 2.16 kg@230° C.) that is less than or equal to 10 dg/min, in other embodiments less than or equal to 1.0 dg/min, and in other embodiments less than or equal to 0.5 dg/min.

Highly Branched Polyolefin

In particular embodiments, the propylene-based polymers or ethylene-based polymers include high viscosity, long-chain branched polyolefins.

In one or more embodiments, the high viscosity, long-chain branched polyolefins may be characterized by a melt flow rate that is less than about 8 dg/min, in other embodiments less than 5 dg/min, in other embodiments less than 2, and in other embodiments less than 1 dg/min, as determined by ASTM D-1238 at 230° C. and 2.16 kg load.

In one or more embodiments, the high viscosity, long-chain branched polyolefins can be characterized by a weight average molecular weight ($M_w$) in excess of 350,000, in other embodiments in excess of 375,000, and in other embodiments in excess of 400,000. These high viscosity, long-chain branched polyolefins may also be characterized by an $M_w$ that is less than 600,000, in other embodiments less than 500,000, and in other embodiments less than 450,000.

In one or more embodiments, the high viscosity, long-chain branched polyolefins may be characterized by a Z-average molecular weight ($M_z$) that is in excess of 800,000, in other embodiments in excess of 1,000,000, and in other embodiments in excess of 1,100,000. These polyolefins may also be characterized by an $M_z$ that is less than 2,000,000, in other embodiments less than 1,500,000, in other embodiments less than 1,300,000.

In one or more embodiments, the high viscosity, long-chain branched polyolefin may be characterized by a number average molecular weight ($M_n$) that is in excess of 40,000, in other embodiments in excess of 50,000, and in other embodiments in excess of 60,000. These polyolefins may be characterized by an $M_n$ that is less than 200,000, in other embodiments less than 150,000, and in other embodiments less than 120,000. The molecular weight refers to $M_w$, $M_n$, and $M_z$ as determined by gel permeation chromatography with polystyrene and/or polyethylene standards with the polymer dissolved in 1,2,4-trichlorobenzene at 145° C. Similar methods are disclosed in U.S. Pat. No. 4,540,753, which is incorporated herein by reference for U.S. patent practice.

In one or more embodiments, the high viscosity, long-chain branched polyolefins are characterized by $M_w/M_n$ that is in excess of 4.5, in other embodiments in excess of 5.0, and in other embodiments in excess of 5.5. In one or more embodiments, the high viscosity, long-chain branched polyolefins may be characterized by an $M_z/M_w$ in excess of 2.7, in other embodiments in excess of 3.0, and in other embodiments in excess of 3.3.

In one or more embodiments, the high viscosity, long-chain branched polyolefins may also be characterized by a viscosity average branching index of less than 0.9, in other embodiments less than 0.7, and in other embodiments less than 0.5.

The branching index, gN, at a given molecular weight is determined according to the formula $g'=[\eta]_{branched}/[\eta]_{linear}$, where $[\eta]$ branched is the viscosity of the branched polymer at a given molecular weight slice, i, and $[\eta]_{linear}$ is the viscosity of the known linear reference polymer at the given molecular weight slice.

The viscosity average branching index ($<g'>_{vis}$) of the entire polymer may be obtained from the following equation:

$$<g'>_{vis} = \frac{\sum_{i=1}^{N} C_i[\eta]_i}{\sum_{i=1}^{N} C_i[KM_i^\alpha]}$$

where Mi is the molecular weight of the polymer, $[\eta]_i$ is the intrinsic viscosity of the branched polymer at molecular weight Mi, $C_i$ is the concentration of the polymer at molecular weight Mi, and K and α are measured constants from a linear polymer as described by Paul J. Flory at page 310 of PRINCIPLES OF POLYMER CHEMISTRY (1953), and the summation is over all the slices in the distribution. The $<g'>_{vis}$ values are obtained by gel permeation chromatography (GPC) while the polymer is in dilute solution within 1,2,4 trichlorobenzene. The GPC is equipped with triple detectors; differential refractive index (DRI), light scattering and viscosity. The DRI is calibrated with both polystyrene and low molecular weight polyethylene standards, the light scattering detector with a series of polymers of known molecular weight, and the differential viscometer with a series of polymers of known intrinsic viscosities.

For purposes of defining the high viscosity, long-chain branched polyolefins of one or more embodiments of this invention, $<g>_w$ and $<g>_z$ can likewise be employed. $<g>w$ may be obtained from the following equation:

$$<g>_w = \frac{\sum C_i R_{gi}^2}{\sum C_i [KM_i^\alpha]^2}$$

where $M_i$ is the molecular weight of the polymer, $C_i$ is the concentration of the polymer at molecular weight $M_i$, $R_{gi}$ is the radius of gyration of the branched polymer at molecular weight $M_i$, and K and $\alpha$ are measured constants from a linear polymer as described by Paul J. Flory at page 310 of PRINCIPLES OF POLYMER CHEMISTRY (1953), and the summation is over all the slices in the distribution.

Further, $<g>_z$ of the entire polymer may be obtained from the following equation:

$$<g>_z = \frac{\sum C_i M_i R_{gi}^2}{\sum C_i M_i [KM_i^\alpha]^2}$$

where the variables $M_i$, $C_i$, $R_{gi}$, K and $\alpha$ are as described above. $<g>_w$ and $<g>_z$ can be determined by using GPC MALLS (Multiple Angle Laser Light Scattering).

In one or more embodiments, the high viscosity, long-chain branched polyolefins may have a $T_m$ that is greater than 120° C., in other embodiments greater than 140° C., and in other embodiments greater than 155° C., with a range of 120° C. to about 200° C. In one or more embodiments, the high viscosity, long-chain branched polyolefins may have a $T_c$ that is greater than about 90° C., in other embodiments greater than about 100, and in other embodiments greater than about 120° C., with a range of about 90° C. to about 140° C. In one or more embodiments, the high viscosity, long-chain branched polyolefins may have a $T_g$ that is less than 10° C., in other embodiments less than 5° C., and in other embodiments less than 0° C., within a range of about −10° C. to about 10° C.

In one or more embodiments, high viscosity, long-chain branched polyolefins include homopolymers of ethylene or α-olefins, as well as copolymers of two or more α-olefins, or copolymers of one or more α-olefins with ethylene. In certain embodiments, the α-olefins include propylene, 1-butene, 1-hexene, 1-octene, 2-methyl-1-propene, 3-methyl-1-pentene, 4-methyl-1-pentene, 5-methyl-hexene, and mixtures thereof; these α-olefins may be referred to as mono-α-olefins inasmuch as they include only one polymerizable double bond. Specifically included are polypropylene homopolymers or polyethylene homopolymers. In one or more embodiments, long chain branching in the polyolefin is achieved by incorporating less than 0.001, in other embodiments less than 0.0005, and in other embodiments less than 0.0001 percent by weight of units deriving from α,ω-dienes during olefin polymerization. The ethylene-based polymers may contain long-chain branching as in low density polyethylene. In other embodiments, the ethylene polymers can also have long-chain branching through in situ macromer formation and incorporation of the macromer into the growing chain, as with metallocene catalysis. In one or more embodiments, the high viscosity, long-chain branched polyolefins include those polymers and copolymers that are devoid of α,ω-diene units; i.e., polymers and copolymers prepared by polymerizing α,ω-diene monomer are specifically excluded.

In one or more embodiments, the high viscosity, long-chain branched polyolefins employed in this invention are prepared by converting solid, high molecular weight, linear, propylene polymer material with irradiating energy as disclosed in U.S. Pat. No. 5,414,027, which is incorporated herein by reference for purpose of U.S. patent practice. Other techniques include treatment of linear polymer with heat and peroxide as disclosed in U.S. Pat. No. 5,047,485, which is incorporated herein by reference for purpose of U.S. patent practice. Other useful high viscosity, long-chain branched polyolefins are disclosed in U.S. Pat. Nos. 4,916,198, 5,047,446, 5,570,595, and European Publication Nos. 0 190 889, 0 384 431, 0 351 866, and 0 634 441, which are also incorporated herein by reference for purpose of U.S. patent practice.

Other Constituents

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include polyisobutylene, poly(isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil), formerly SHF Fluids (Mobil) and Elevast™ (ExxonMobil). Oils described in U.S. Pat. No. 5,936,028 may also be employed In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Amounts

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 45 percent by weight, in other embodiments at least about 65 percent by weight, and in other embodiments at least about 75 percent by weight of rubber (i.e., dynamically-vulcanized rubber). In these or other embodiments, the amount of rubber within the thermoplastic vulcanizates can be from about 15 to about 90 percent by weight, in other embodiments from about 45 to about 85 percent by weight, and in other embodiments from about 60 to about 80 percent by weight, based on the entire weight of the rubber and thermoplastic combined.

In one or more embodiments, the amount of thermoplastic polymer (i.e., uncured polymer within the thermoplastic phase) within the thermoplastic vulcanizates can be from about 10% to about 85% by weight, in other embodiments from about 10% to about 40% by weight, and in other embodiments from about 12% to about 30%, based on the entire weight of the rubber and thermoplastic combined. In these or other embodiments, the amount of thermoplastic polymer within the thermoplastic phase may be from about 25 to about 250 parts by weight, in other embodiments from about 50 to about 150 parts by weight, and in other embodiments from about 60 to about 100 parts by weight thermoplastic polymer per 100 parts weight rubber. In particular embodiments, the thermoplastic phase of the thermoplastic vulcanizates of the present invention includes 100% butene-1-based polymer.

With respect to the thermoplastic phase, the amount of butene-1-based polymer present within the phase may vary in the presence of a complementary thermoplastic resin. For example, it may include from about 75% by weight to about 100% by weight, in other embodiments from about 85% by weight to about 99% by weight and in other embodiments from about 95 to about 98% by weight of butene-1-based polymer based upon the total weight of the thermoplastic phase, with balance of the thermoplastic phase including an ethylene-based polymer. For example, the thermoplastic phase may include from about 0% by weight to about 25% by weight, in other embodiments from about 1% by weight to about 15% by weight, and in other embodiments from about 2 to about 5% by weight of an ethylene-based polymer based upon the total weight of the thermoplastic phase.

In these or other embodiments, where the thermoplastic phase may include a propylene-based polymer in addition to the butene-1-based polymer, the thermoplastic phase may include from about 51 to about 100%, in other embodiments from about 65 to about 99.5%, in other embodiments from about 85 to about 99%, and in other embodiments from about 95 to about 98% by weight butene-1-based polymer based upon the total weight of the thermoplastic phase, with balance of the thermoplastic phase including an propylene-based polymer. For example, the thermoplastic phase may include from about 0 to about 49%, in other embodiments from about 1 to about 15%, and in other embodiments from about 2 to about 5% by weight propylene-based polymer based upon the total weight of the thermoplastic phase.

With respect to the oil, the thermoplastic vulcanizate may include from about 25 to about 250 parts by weight, or from about 50 to about 150 parts by weight, or from about 75 to about 130 parts by weight, of extender oil per 100 parts rubber. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable.

Fillers, such as carbon black, clay, talc, or calcium carbonate may be added in amount from about 1 to about 250 parts by weight, in other embodiments from about 10 to about 150 parts by weight, and in other embodiments from about 25 to about 50 parts by weight, per 100 parts by weight of rubber. The amount of carbon black that can be used may depend, at least in part, upon the type of carbon black and the amount of extender oil that is used.

Preparation of TPV

In one or more embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic.

In one embodiment, the rubber can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing thermoplastic vulcanizates are described in U.S. Pat. Nos. 4,311,628, 4,594,390, 6,503,984, and 6,656,693, although methods employing low shear rates can also be used. Multiple-step processes can also be employed whereby ingredients, such as additional thermoplastic resin, can be added after dynamic vulcanization has been achieved as disclosed in International Application No. PCT/US04/30517. The skilled artisan will be able to readily determine a sufficient or effective amount of vulcanizing agent to be employed without undue calculation or experimentation.

As noted above, the thermoplastic vulcanizates prepared according to the present invention are dynamically vulcanized by employing a phenolic resin cure system or a silicon-containing cure system.

Useful phenolic cure systems are disclosed in U.S. Pat. Nos. 2,972,600, 3,287,440, 5,952,425 and 6,437,030.

In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octylphenol-formaldehyde and nonylphenol-formaldehyde resins are employed. The blend includes from about 25 to about 40% by weight octylphenol-formaldehyde and from about 75 to about 60% by weight nonylphenol-formaldehyde, in other embodiments, the blend includes from about 30 to about 35 weight percent octylphenol-formaldehyde and from about 70 to about 65 weight percent nonylphenol-formaldehyde. In one embodiment, the blend includes about 33% by weight octylphenol-formaldehyde and about 67% by weight nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula

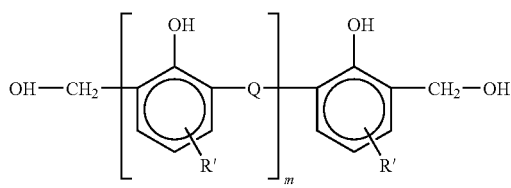

where Q is a divalent radical selected from the group consisting of —$CH_2$—, —$CH_2$—O—$CH_2$—; m is zero or a positive integer from 1 to 20 and R' is an organic group. In one embodiment, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

In one or more embodiments, the phenolic resin is used in conjunction with a cure accelerator such as stannous chloride, and metal oxide such as zinc oxide, which is believed to function as a scorch retarder and acid scavenger and/or polymer stabilizer.

In one or more embodiments, the phenolic resin may be employed in an amount from about 2 to about 6 parts by weight, in other embodiments from about 3 to about 5 parts by weight, and in other embodiments from about 4 to about 5 parts by weight per 100 parts by weight of rubber. A complementary amount of stannous chloride may include from about 0.5 to about 2.0 parts by weight, in other embodiments from about 1.0 to about 1.5 parts by weight, and in other embodiments from about 1.2 to about 1.3 parts by weight per 100 parts by weight of rubber. In conjunction therewith, from about 0.1 to about 6.0 parts by weight, in other embodiments from about 1.0 to about 5.0 parts by weight, and in other embodiments from about 2.0 to about 4.0 parts by weight of zinc oxide may be employed. In one or more embodiments, the olefinic rubber employed with the phenolic curatives includes diene units deriving from 5-ethylidene-2-norbornene.

Silicon-containing cure systems may include silicon hydride compounds having at least two SiH groups. Silicon hydride compounds that are useful in practicing the present invention include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

In one or more embodiments, the silane-containing compounds may be employed in an amount from about 0.5 to about 5.0 parts by weight, in other embodiments from about 1.0 to about 4.0 parts by weight, and in other embodiments from about 2.0 to about 3.0 parts by weight per 100 parts by weight of rubber. A complementary amount of catalyst may include from about 0.5 to about 20.0 parts, in other embodiments from about 1.0 to about 5.0 parts, and in other embodiments from about 1.0 to about 2.0 parts of metal per million parts by weight of the rubber. In one or more embodiments, the olefinic rubber employed with the hydrosilylation curatives includes diene units deriving from 5-vinyl-2-norbornene.

Characteristics of TPV

In one or more embodiments, the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one or more embodiments, the rubber has a degree of cure where not more than 5.9 weight percent, in other embodiments not more than 5 weight percent, in other embodiments not more than 4 weight percent, and in other embodiments not more than 3 weight percent is extractable by cyclohexane at 23° C. as described in U.S Pat. Nos. 5,100,947 and 5,157,081, which are incorporated herein by reference for purpose of U.S. patent practice. In these or other embodiments, the rubber is cured to an extent where greater than 94%, in other embodiments greater than 95%, in other embodiments greater than 96%, and in other embodiments greater than 97% by weight of the rubber is insoluble in cyclohexane at 23° C. Alternatively, in one or more embodiments, the rubber has a degree of cure such that the crosslink density is preferably at least $4\times10^{-5}$, in other embodiments at least $7\times10^{-5}$, and in other embodiments at least $10\times10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Despite the fact that the rubber may be fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology may exist. In those embodiments where the cured rubber is in the form of finely-divided and well-dispersed particles within the thermoplastic medium, the rubber particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

The thermoplastic vulcanizates of this invention may be advantageously characterized by a low compression set, as determined according to ASTM D-395 (B) after the samples are subjected to 25% compression for 22 hours at 100 °C., of less than 50%, in other embodiments less than 40%, in other embodiments less than 30%, and in other embodiments less than 20%.

In order to demonstrate the practice of the present invention, the following examples have been prepared and tested. The examples should not, however, be viewed as limiting the scope of the invention. The claims will serve to define the invention.

EXAMPLES

Samples 1-4

Four thermoplastic vulcanizates were prepared by dynamically vulcanizing an elastomeric copolymer within a Brabender mixer using conventional procedures by effecting vulcanization with a phenolic resin in the presence of stannous chloride ($SnCl_2.2H_2O$) and zinc oxide. Specifically, thermoplastic vulcanizates were prepared under nitrogen in a laboratory Brabender-Plasticorder (model EPL-V5502). The mixing bowls had a capacity of 85 ml with the cam-type rotors employed. The plastic was initially added to the mixing bowl that was heated to 180° C. and at 100 rpm rotor speed. After plastic melting (2 minutes.), the rubber, tin(II)chloride, and zinc oxide were packed in to the mixer and melt mixed for two minutes. The paraffinic oil was then added dropwise over a minute, and mixing was continued for 1-5 minutes (a steady torque was obtained at this time) before the addition of phenolic resin which caused an increase in motor torque.

Mixing was continued for about 4 more minutes, after which the molten TPV was removed from the mixer, and pressed when hot between Teflon plates into a sheet which was cooled, cut-up, and compression molded at 400° F. A Wabash press, model 12-1212-2 TMB was used for compression molding, with 4.5"×4.5"×0.06" mold cavity dimensions in a 4-cavity Teflon-coated mold. Material in the mold was initially preheated at 400° F. for 2-2.5 min. at a 2-ton pressure on a 4" ram, after which the pressure was increased to 10-tons, and heating was continued for 2-2.5 min. more. The mold platens were then cooled with water, and the mold pressure was released after cooling (about 70° C.).

Table I provides the ingredients and amounts (parts by weight) that were employed in each sample. The elastomeric copolymer was poly(ethylene-co-propylene-co-5-ethylidene-2-norbornene) characterized by having a diene content of about 3.9 weight percent, a Mooney viscosity $ML_{(1+4)}$@125° C. of about 52 (oil extended), an intrinsic viscosity (dl/g) in decalin of about 4 dl/g, a weight average molecular weight of about 850 kg/mole, a number average molecular weight of about 170 kg/mole, an ethylene content of about 64 weight percent, a paraffinic oil content of 75 phr (the parts by weight of rubber simply refers to the amount of rubber even though the rubber stock included a paraffinic oil) and was obtained under the tradename V₃666™ (ExxonMobil). The phenolic curative was a resole-type resin obtained under the tradename SP1045™ (Pastilles). The polypropylene was obtained under the tradename 51SO7A™ (Sunoco) and was characterized by a 0.7 dg/min MFR. The poly(butene-1) was obtained under the tradename PB0110M™ (Basell) and was characterized by 1.0 MI. The paraffinic oil was obtained under the tradename Sunpar™ 150M (Sunoco).

Table I sets forth the ingredients used in each sample and the results of physical testing that was performed on each sample. Those samples that correspond with the present invention are designated with the letter "I," and those that are comparative are designated with the letter "C."

TABLE I

| | Samples | | | |
|---|---|---|---|---|
| | 1 | 2 | 3 | 4 |
| | Comparative/Inventive | | | |
| | C | I | C | I |
| TPV Ingredients (parts by weight) | | | | |
| Oil-Extended Rubber | 175 | 175 | 175 | 175 |
| Polypropylene | 155 | — | 45 | — |
| Poly(butene-1) | — | 155 | — | 45 |
| Paraffinic Oil | 30 | 30 | 30 | 30 |
| Stannous Chloride | 1.80 | 1.80 | 1.80 | 1.80 |
| Zinc Oxide | 2.00 | 2.00 | 2.00 | 2.00 |
| Phenolic Resin | 6.0 | 6.0 | 6.0 | 6.0 |
| TPV Properties | | | | |
| Shore A Harness | 92 | 83 | 68 | 56 |
| Ultimate Tensile Strength (MPa) | 10.89 | 6.37 | 5.22 | 3.74 |
| Ultimate Elongation (%) | 335 | 158 | 298 | 227 |
| M100 (MPa) | 8.02 | 5.66 | 2.68 | 1.86 |
| Compression Set (%) | 50 | 29 | 28 | 21 |
| Tensile Set (%) | 25 | 14 | 6 | 5 |

Dog-bones were cut out of the molded (aged at room temperature for 24 hr.) plaque for tensile testing (0.16" width, 1.1" test length (not including tabs at end)). Ultimate tensile strength, ultimate elongation, and 100% modulus were determined according to ASTM D-412 at 23EC by using an Instron testing machine. Tension set was determined according to ASTM D-412, and compression set was determined according to ASTM D-395(B) with the following particulars. The tension set specimens were 0.1" wide, with a 2" test length (not including tabs at end). Tension set was measured at room temperature by holding the specimens in a jig at 100% elongation for 10 min., and then allowing the unloaded test specimen to relax for 10 min., before measuring "set". For compression set measurement, 6-7 buttons (0.75" dia.) were cut from the compression molded plaques, stacked, and compressed 25% in a jig before heating to the test temperature. At the end of the test period, the hot buttons were recovered from the jig and cooled for 0.5 hr. in air before measuring the "set" taken by the sample. Shore hardness was determined according to ISO 868 and/or per ASTM D-2240 with a 5 second time interval All test samples were prepared on compression-molded plaques having a thickness of 2.0 mm. The data in Table I shows that thermoplastic vulcanizates that include poly(butene-1) as the thermoplastic phase are characterized by advantageously low compression set without deleterious impact on other properties. It is noted that Sample 2 is softer than Sample 1, and therefore conventional wisdom would suggest that the compression set would be lower. But, a comparison of Samples 2 and 3 is particularly enlightening. That is, the compression set numbers are similar and yet comparative Sample 3 is substantially softer than the inventive Sample 2. Accordingly, one should conclude that the poly(butene-1) has an advantageous impact on the compression set of the thermoplastic vulcanizates.

Samples 5-8

Four additional thermoplastic vulcanizates were prepared using similar techniques as the previous samples except that dynamic vulcanization was effected with a hydrosilylating agent in the presence of a platinum catalyst. Specifically, after melt mixing the plastic, rubber, and oil, as was done in the previous samples, the silicon hydride curative was added dropwise about 1.5 minutes after the completion of oil addition. Mixing was then continued for 1.5 minutes more before the dropwise addition of the platinum catalyst. Presumably, the lubrication of the polymer melt blend at the mixer walls by the silicone hydride caused a barely perceptible rise in torque on curative addition. After further mixing for 2.5 minutes from the time of catalyst addition, the molded thermoplastic vulcanizate was removed from the mixer and processed as per the previous samples.

Table II provides the ingredients and amounts (parts by weight) that were employed in each sample. The elastomeric copolymer was poly(ethylene-co-propylene-co-5-vinyl-2-norbornene) characterized by having a diene content of about 0.7 weight percent, a Mooney viscosity $ML_{(1+4)}$@125° C. of about 52 (oil extended), an intrinsic viscosity (dl/g) in decalin of about 5 dl/g, a weight average molecular weight of about 950 kg/mole, a number average molecular weight of about 120 kg/mole, an ethylene content of about 63 weight percent, and a white oil content of 100 phr (the parts by weight of rubber simply refers to the amount of rubber even though the rubber stock included paraffinic oil). The silane curative was a methylhydrosiloxane-octylmethylsiloxane copolymer hydrosilylating agent obtained under the tradename DC2-5084™ (Dow Corning), and was characterized by a molecular weight of 1,800 g/mole and active hydrogen content of 7.2 equivalents/kg. The catalyst concentrate contained 2.2 weight percent of platinum zero metal in tetramethyltetravinylcyclotetrasiloxane solution obtained under the tradename PC085™ (United Catalyst Technologies). The catalyst concentrate was diluted to an 0.22 weight percent solution in white paraffinic oil before use. The polypropylene was obtained under the tradename 51SO7A™ (Sunoco) and was characterized by a 0.7 dg/min MFR. The poly(butene-1) was obtained under the tradename PB 0110M™ (Basell) and was characterized by 0.35 MI.

Table II also sets forth the results of physical testing that was performed on each sample. Those samples that correspond with the present invention are designated with the letter "I," and those that are comparative are designated with the letter "C."

TABLE II

| | Samples | | | |
|---|---|---|---|---|
| | 5 | 6 | 7 | 8 |
| Comparative/Inventive | | | | |
| TPV Ingredients (parts by weight) | | | | |
| Oil-Extended Rubber | 200 | 200 | 200 | 200 |
| Polypropylene | 200 | — | 50 | — |
| Poly(butene-1) | — | 200 | — | 50 |
| White Oil | 30.0 | 30.0 | 30.0 | 30.0 |
| Silane Curative | 3.00 | 3.00 | 3.00 | 3.00 |
| Platinum Catalyst | 4.00 | 4.00 | 4.00 | 4.00 |
| TPV Properties | | | | |
| Shore A Harness | 92 | 83 | 61 | 54 |
| Ultimate Tensile Strength (MPa) | 7.68 | 6.23 | 4.28 | 2.39 |
| Ultimate Elongation (%) | 168 | 132 | 307 | 191 |
| M100 (MPa) | 7.61 | 5.57 | 1.98 | 1.46 |
| Compression Set (%) | 54 | 27 | 25 | 18 |
| Tensile Set (%) | 27 | 16 | 6 | 5 |

The data in Table II is consistent with the data of Table II, which shows the benefits of practicing the present invention with another cure system that is capable of fully curing the thermoplastic vulcanizate.

Various modifications and alterations that do not depart from the scope and spirit of this invention will become apparent to those skilled in the art. This invention is not to be duly limited to the illustrative embodiments set forth herein.

What is claimed is:

1. A thermoplastic vulcanizate consisting of:
   (i) 155 parts by weight poly(butene-1) characterized by a 0.7 dg/min MFR, determined according to ASTM D-1238 using 2.16 kg at 230° C., 30 parts by weight paraffinic oil, 1.8 parts by weight stannous chloride, 2 parts by weight zinc oxide, and 6 parts by weight phenolic resin, each based on 100 parts by weight poly (ethylene-co-propylene-co-5-vinyl-2-norbornene); and
   (ii) where said thermoplastic vulcanizate is characterized by a tensile strength determined according to ASTM D-412 at 23-° C., of 6.37 MPa and a Shore A hardness of 83;
   (iii) 100 parts by weight poly(ethylene-co-propylene-co-5-vinyl-2-norbornene) having 3.9 wt percent 5-vinyl-2-norborene and 64 wt percent ethylene; an oil-extended Mooney viscosity ML(1+4) at 125° -C. of 52; an intrinsic viscosity in decalin of 4 dl/g; and a weight average molecular weight of 850 kg/mole; and
   (iv) 75 parts by weight white oil in combination with the poly(ethylene-co-propylene-co-5-vinyl-2-norbornene).

2. A thermoplastic vulcanizate consisting of:
   (i) 200 parts by weight poly(butene-1) characterized by a 0.7 dg/min MFR according to ASTM D-1238 using 2.16 kg at 230° C., 30 parts by weight white oil, 3 parts by weight methylhydrosiloxane-octylmethylsiloxane copolymer, and 4 parts by weight platinum catalyst consisting of 2.2 wt percent platinum zero metal in tetramethyltetravinylcyclotetrasiloxane solution, each based on 100 parts by weight poly(ethylene-co-propylene-co-5-vinyl-2-norbornene);
   (ii) where said thermoplastic vulcanizate is characterized by a tensile strength according to ASTM D-412 23-° C. of 6.23 MPa and a Shore A hardness of 83;
   (iii) 100 parts by weight poly(ethylene-co-propylene-co-5-vinyl-2-norbornene) having 0.7 wt percent 5-vinyl-2-norborene and 63 wt percent ethylene; an oil extended Mooney viscosity ML(1+4) at 125° -C. of 52; and an intrinsic viscosity in decalin of 5 dl/g; and a weight average molecular weight of 950 kg/mole; and
   (iv) 100 parts by weight white oil in combination with the poly(ethylene-co-propylene-co-5-vinyl-2-norbornene).

* * * * *